Patented Apr. 14, 1931

1,800,693

UNITED STATES PATENT OFFICE

RALPH MARSHALL MAJOR, OF EVANSVILLE, INDIANA, ASSIGNOR TO SERVEL INC., OF NEW YORK, N. Y., A CORPORATION OF DELAWARE

TESTING FOR LEAKS IN REFRIGERATING SYSTEMS

No Drawing.   Application filed June 18, 1930. Serial No. 462,155.

This invention relates to the art of refrigeration and more particularly to a method of detecting leakage of a refrigerant containing a warning agent from a closed refrigerating system. Such warning agent is described in the copending application of Walter A. Kuenzli filed concurrently herewith and comprises acrolein, allyl aldehyde or acrylaldehyde in concentrations of .05% up to 5.00%. The use of a warning agent of the character described will readily indicate the escape of refrigerant from a system and will enable persons to leave the room or apartment before breathing harmful quantities of the fumes. While it is easy to determine that there is a leak in the system, it is ofttimes difficult to locate a leak in order to make necessary repairs.

It is an object of the invention to provide a method of easily and simply locating or detecting a leak.

The above object is accomplished by the provision of a reagent which will have a color reaction when it comes in contact with a small quantity of the escaping acrolein-containing refrigerant. A satisfactory reagent has been found to comprise a solution of rosaniline-hydrochloride and sulphurous acid, which turns a purple or violet color when a small trace of the above refrigerant comes in contact with it.

A wad of cotton or a filter paper may serve as a suitable vehicle for the reagent and in application such wad of cotton or filter paper is dipped in the colorless solution of the reagent and is then applied to that portion of the apparatus which is supposed to contain the leak. Such application may be by swabbing or by passing the saturated cotton or filter paper along the pipes and around the joints of the device and upon which will appear the violet or purple color when the same is brought in sufficient proximity to the leak to cause the escaping refrigerant to come in contact with the same. By this method small leaks may be readily located, it being of course understood that large leaks may be discovered by the irritating and lachrymating effects of the acrolein vapors and the use of the reagent is not required if the leak is sufficiently large.

The invention is not intended merely to indicate the leakage of a refrigerant containing a small percent of acrolein but can be used for the detection of the organic chemicals susceptible of use as warning agents known as aldehydes when used with methyl chloride, ethyl chloride or other odorless refrigerant fluids.

In lieu of acrolein any of the organic chemicals known as aldehydes may be added to odorless colorless refrigerants with substantially the same results. The properties of the refrigerant are substantially unaltered by the addition of the warning agent above mentioned and it is found that this warning agent enters readily into the solution of the refrigerant and at the same time does not have a corrosive effect on metals in the presence of moisture.

I claim:—

1. The method of detecting a leak of an odorless refrigerant which does not of itself react chemically with any known reagent comprising incorporating acrolein with the refrigerant, and applying a reagent of rosaniline hydrochloride and sulphurous acid to that part of the system where the leak is supposed to exist.

2. The method of testing leakage of an odorless evaporative fluid which does not of itself react chemically with any known reagent comprising incorporating acrolein with said fluid in a closed system, and applying a reagent to the exterior of the system to be tested.

3. A method for the detection of an odorless evaporative fluid which does not of itself react chemically with any known reagent comprising adding a lachrymating substance which will be retained in solution with said odorless evaporative fluid and which is sensitive to the action of suitable reagent, and detecting the presence of the substance with the use of such reagent.

4. A method for the detection of methyl chloride which does not of itself react chemically with any known reagent comprising adding acrolein which will be retained in solution with said methyl chloride and sensitive to the action of a suitable reagent and detecting the acrolein contained methyl chloride by the use of a reagent comprising rosaniline hydrochloride and sulphurous acid.

5. The method for the detection of leaks in refrigerating systems employing methyl chloride as a refrigerant comprising the addition of a small quantity of acrolein to the methyl chloride and testing for the location of the leak by placing thereon a vehicle saturated with a reagent comprising rosaniline hydrochloride and sulphurous acid.

6. A method for detecting leaks in a system containing methyl chloride comprising adding acrolein to the methyl chloride, and detecting the presence of acrolein at the point of leakage in the system by means of its reaction with rosaniline hydrochloride and sulphurous acid.

7. A method for detecting leakage in a system containing methyl chloride to which has been added acrolein, which comprises determining the presence of acrolein at the point of leakage by means of a characteristic color reaction with a reagent.

In testimony whereof I affix my signature.

RALPH MARSHALL MAJOR.